J. J. MAHONEY & W. L. NORRIS.
PIPE SCREWING MACHINE.
APPLICATION FILED MAY 25, 1915. RENEWED MAY 29, 1916.

1,210,825.

Patented Jan. 2, 1917.
2 SHEETS—SHEET 1.

Fig. 1.

WITNESSES:
Charles Rokles
Thos Eastberg

INVENTORS
John J. Mahoney
William L. Norris
BY G. H. Strong
ATTORNEY

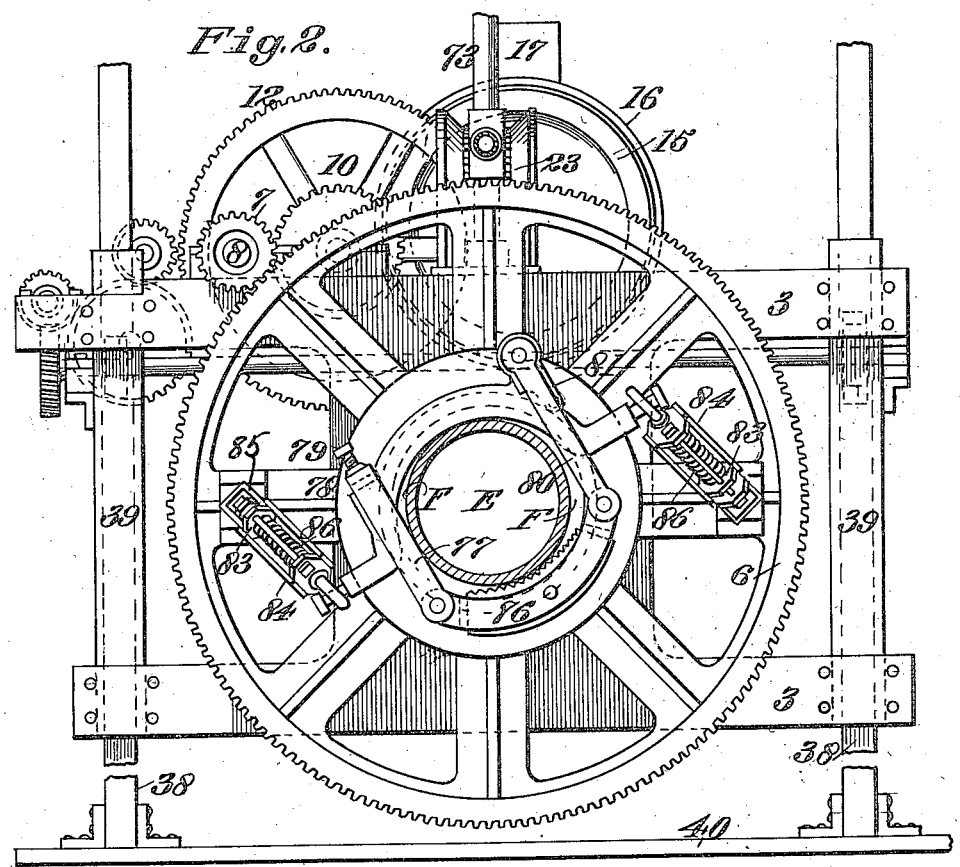

UNITED STATES PATENT OFFICE.

JOHN J. MAHONEY, OF SAN FRANCISCO, AND WILLIAM L. NORRIS, OF BERKELEY, CALIFORNIA, ASSIGNORS TO CALIFORNIA PIPE LINE MACHINE CO., OF SAN FRANCISCO, CALIFORNIA, A CORPORATION OF CALIFORNIA.

PIPE-SCREWING MACHINE.

1,210,825.          Specification of Letters Patent.         Patented Jan. 2, 1917.

Original application filed May 7, 1913, Serial No. 766,056, now Patent No. 1,143,844. Divided and this application filed May 25, 1915, Serial No. 30,341. Renewed May 29, 1916. Serial No. 100,701.

*To all whom it may concern:*

Be it known that we, JOHN J. MAHONEY, of the city and county of San Francisco, and State of California, and WILLIAM L. NORRIS, of Berkeley, in the county of Alameda and State of California, citizens of the United States, have invented new and useful Improvements in Pipe-Screwing Machines, of which the following is a specification.

This invention relates to pipe screwing machines, and has for its object to connect or disconnect screw-threaded pipe sections in an improved and simplified manner.

In carrying out this object we employ a frame adapted to receive a pipe and lock it against turning movement and rotatable means thereon, connectible in an improved manner with the pipe to be screwed in place.

One form which our invention may assume is exemplified in the following description and illustrated in the accompanying drawing, in which—

Figure 1 is a plan view of a machine embodying our invention. Fig. 2 shows a front end elevation, with parts removed. Fig. 3 shows a detail section and elevation on the line A—A of Fig. 1. Fig. 4 shows a detail section of the mechanism for clamping the machine to the pipe line. Fig. 5 shows a detail in elevation of the expansible and contractible pipe clamp carrying device. Fig. 6 shows a vertical section on the line C—C of Fig. 5.

In the drawings, the frame or carriage body of the machine is indicated at 2, and is here shown as consisting of a tubular member adapted to surround the pipe to be laid. This carriage body 2 is preferably formed of a large diameter of pipe. The forward end of the carriage body 2 extends through and is secured to a channel plate 3, and is provided with similar channel plates 4 throughout its length to form suitable supports for the bearings of various mechanisms to be hereinafter described.

Revolubly mounted on the forward end of the carriage 2, is a toothed wheel 6, which wheel is adapted to be rotated by means of a pinion 7, carried on a short shaft 8, journaled in suitable bearings. The shaft 8 carries a pair of spaced toothed wheels 9 and 9', which are adapted to be engaged by toothed wheels 10 and 10' of different diameters, mounted to move longitudinally on a countershaft 11 and revoluble therewith. The toothed wheels 10 and 10' are adapted to be shifted by means of a hand lever 11' to throw the toothed wheel 10 into engagement with the toothed wheel 9', the toothed wheel 10' into engagement with the toothed wheel 9', or dispose the toothed wheels 10 and 10' between the toothed wheels 9 and 9' out of engagement therewith.

The toothed wheels 9 and 10 and 9' and 10' are of different diameters in relation to each other for the purpose of varying the speed of rotation of the shaft 8, and consequently the pinion 7 and toothed wheel 6 in relation to the countershaft 11. The countershaft 11 extends parallel with the carriage 2 and is revolubly mounted in suitable bearings carried by the channel plates 3 and 4. A toothed wheel 12 is mounted on the countershaft 11 and is adapted to be engaged by either one of two pinions 13 and 13'.

The pinion 13 is slidably mounted on the squared portion of a shaft 14, on which is mounted a friction disk 15, adapted to be thrown in and out of engagement with the fly-wheel 16, on the drive shaft of a suitable engine or motor 17, mounted on the carriage 2. The pinion 13' is an idler and is loosely mounted on a stud shaft 18 and is in constant mesh wtih the pinion 13. The pinions 13 and 13' are designed to slide lengthwise on their respective shafts 14 and 18 and are adapted to be thrown alternately in and out of engagement with the toothed wheel 12 to rotate the latter and the shaft 11 when the shaft 14 is connected with the engine shaft through the clutch 15 and fly-wheel 16.

The means for shifting the pinions 13 and 13' is here shown as consisting of yokes 19 and 19', which are slidably mounted on the shafts 14 and 18 and extend on the opposite sides of the pinions 13 and 13'. The yokes 19 and 19' are connected together by means of a link 20 which is slotted longitudinally to receive pins 20' carried by the yokes 19 and 19'. The lower end of the link 20 is connected to a hand lever 21, fulcrumed at 22, in such a manner that when the hand lever 21 is rocked, the link 20 will operate to move the pinion 13 in one direction and the pinion 13' in the opposite direction. The pinions 13 and 13' have a limited movement on their respective shafts 14 and 18, and are so arranged and positioned in relation to each other, that when disposed in an intermediate position, as shown in Fig. 2, the pinions 13 and 13' will be out of engagement with the gear 12. By shifting the hand lever 21 to the right the pinion 13 will be thrown into mesh with the toothed wheel 12 to drive the latter directly from the shaft 14, and when the hand lever 21 is thrown to the extreme position to the left, the pinion 13 will be moved out of mesh with the toothed wheel 12 and the pinion 13 will be thrown into mesh with the toothed wheel 12, so that the latter will be rotated indirectly from the shaft 14 through the pinions 13 and 13'; the pinion 13' being such width as to be engaged by the pinions 13 when the latter is in its outermost position.

By the operation of the hand lever 21 to shift the pinions 13 and 13', as just described, the direction of rotation of the toothed wheel 12, countershaft 11, the toothed wheels 10 and 10', 9 and 9', pinion 7. and the toothed wheel 6 may be varied as desired and rotated by means of the engine 17 through the clutch 15 and shaft 14.

The carriage 2 is designed to travel and be propelled in either direction on the pipe line for constructing which this machine is designed. For this purpose a flanged tractor wheel 23 is provided, the actuating mechanism for which is not herein specifically described, as it forms the subject matter of a separate application, filed even date herewith, Serial No. 30,340.

Means are provided for supporting the outer end of the carriage body 2 independently of the pipe line 1, and by means of which the carriage body 2 may be held securely against movement either longitudinally, laterally or vertically. This means is here shown as consisting of a pair of vertical standards 38, which are slidably and adjustably mounted in guides 39, carried by the channel plate 3. The lower ends of the standards 38 are connected together by means of a growler board 40. The growler board 40 is adapted to rest upon the ground and span a ditch or trench and form a level support for the standards when the ground is uneven and rough. The means for adjusting said carriage vertically upon the standards need not here be described in detail, as it forms the subject matter of a separate application, filed even date herewith, Serial No. 30,339.

Means are provided for clamping or locking the carriage frame 2 to the pipe D so as to prevent rotation of the latter and also to secure the carriage body 2 against longitudinal movement. This means is particularly illustrated in Fig. 3, and consists of a curved arm 59 carrying gripping teeth 59' pivotally attached at one end to a link 60, pivoted at 61 to one side of the carriage body 2; the arm 59 being adapted to extend through a circumferential slot 62. The slot 62 is formed on the underside of the carriage body to position the teeth 59' on the concave upper edge of the curved arm in engagement with the underside of the pipe D. The outer end of the arm 59 extends through a link 63 and is held in engagement therewith by means of a pin 64 carried on the outer end of the arm 59. The upper end of the link 63 is pivotally connected by a pin 65 to a slotted link 66 pivoted on a stud 67 on the carriage body 2, and the upper end of the link 66 is adapted to extend into a slotted arm 68 pivoted at 69 to the carriage body 2; the upper end of the link 66 being designed to be disposed rearward of a block 70 which is reciprocally mounted in the slotted arm 68. The pivot pin 65, connecting the link 63 and the link 66, extends on opposite sides of the latter in such a manner as to engage the underside of the slotted arm 68 to support the arm on the link 66.

Mounted in the outer end of the slotted arm 68 is a threaded shaft 71, provided with a handhold 72, by means of which the shaft 71 may be rotated in its threaded bearings to advance the block 70 against the upper end of the link 66 and move the latter in a rearward direction to exert an upward pull on the link 63 and the curved arm 59 to cause the latter to bear against the underside of the pipe D. The upward movement of the pipe D, when the curved arm 59 is pulled upwardly, is opposed by a downwardly extending flange 23' mounted on the interior of the carriage body 2. The arm 59 thus serves to clamp the pipe D against the flange 23' to hold the pipe against movement and also locks the carriage body 2 thereon; the teeth 59' acting to prevent turning of the pipe D in relation to the carriage 2.

Mounted on the channel plate 3, at the front end of the machine is a mast 73, carrying a boom, not shown, which extends forward of the carriage body 2 and supports a pipe section E which is to be connected to the pipe D. Means are provided for gripping the pipe E, and connecting it to the toothed wheel 6, so that when the latter is rotated the threaded end of the pipe E may be screwed in or out of a coupling F on the outer end of the pipe D. The pipe gripping means is here shown, particularly in Figs. 1 and 2, as consisting of an arched arm 75, adapted to extend over the pipe E, and a curved gripping jaw 76 carried by the arched arm 75 which latter and jaw 76 are designed to be adjusted in relation to each other to clamp the pipe E against rotation therebetween.

The connections between the jaw 76 and the arm 75 consist of a yoke 77 pivoted at one end to the jaw 76 and straddling a shoulder 78 on the arched arm 75, and an adjusting bolt 79 screwed in the outer end of the yoke 77 bearing against the shoulder 78. The bolt 79 is provided for the purpose of adjusting the position of the pivoted connection between the yoke 77 and the jaw 76 with relation to the arched arm 75. The outer end of the gripping jaw 76 pivotally connects with a link 80, the upper end of which connects with a short link 81 forming a toggle which is adapted to be operated to move the arched arm 75 and the jaw 76 toward and away from each other. When the toggle is thrown inwardly beyond the center, as shown in Fig. 2, it serves to lock the jaw 76 against the pipe E so as to clamp the latter between the jaw and the arched arm. The arched arm 75 is connected at its ends to the toothed wheel 6; corresponding strain equalizers being interposed between the ends of the arched arm 75 and the toothed wheel 6 for the purpose of equalizing the strains on the gripping members and for cushioning the strains imposed upon the pipe E and gripping members when the toothed wheel 6 is rotated.

One of the strain equalizers is particularly shown in Figs. 5 and 6. It consists of a plunger 83 which is pivotally connected to the outer end of the arched arm 75, the plunger 83 being mounted in a frame 84, pivotally attached to a yoke 85 having a swiveled connection with the toothed wheel 6. A helical spring 86 is interposed between the head of the plunger 83 and the frame 84 in such a manner as to oppose the outward movement of the plunger 83 and the frame 84 in relation to each other; the spring 86 forming a resilient or expansible and contractible connection between the gripping member and the toothed wheel 6.

Means are provided for indicating the strains imposed upon the gripping members 75 and 76, which means is controlled by the tension of the spring 86. This means is here shown as consisting of a toothed rack 87, carried by the plunger 83, for engaging a pinion 88 mounted on a shaft 89 journaled in the frame 84 and having an indicator or pointer 90 adapted to travel over a scale 91, which scale 91 is formed on the face of the frame 84. The scale 91 is graduated in pounds according to the tension of the spring 86, so that when the latter is compressed the strains imposed thereon will be indicated by the pointer 90 and the scale 91.

In the operation of this invention, the pipe D is introduced into the carriage body 2, with its outer end carrying the coupling F, disposed adjacent to the outer or forward end of the carriage body 2, as shown in Fig. 2, the pipe D being supported rearward of the carriage 2 on timbers, not shown, or in any other suitable manner. The height of the carriage 2 is regulated to position it parallel with the pipe D, so that the outer end of the pipe D will be concentric with the toothed wheel 6. The pipe E to be screwed in place is then raised to position in alinement with the pipe D.

When the parts have been positioned as just described, the pipe D is clamped rigidly to the carriage 2 by means of the curved arm 59. The arm 59 is caused to clamp the pipe D against the flange 23' by means of the toggle links 63 and 66 which are lifted into an approximately vertical position by means of a hand hold 66' and are engaged at their upper ends by the block 70 in the slotted arm 68; the threaded shaft or screw 71 being turned to force the upper end of the link 66 backwardly to exert an upward pull on the link 63 and arm 59, causing the arm 59 to engage the underside of the pipe D and lift the latter upward against the flange 23'. When this is done, the pipe D will be securely held against rotation and the pipe D and the carriage body 2 will be firmly locked together.

The clamping members, consisting of the curved arm 75 and the jaw 76, are then placed over the pipe section E, rearward of the threaded outer end thereof, and are arranged some distance from the toothed wheel 6, as shown in Figs. 2 and 3. The pivotal connections of the plunger 83 and the frame 84 to the arm 75 and the toothed wheel 6 are such as to permit the clamping members being positioned a suitable distance from the outer face of the wheel 6. The arm 75 and the gripping jaw 76 are clamped on the pipe E by means of the toggle links 80 and 81 and the yokes 77 and the bolt 79, as before described, sufficiently tight to prevent the rotation of pipe E with relation to the clamping members 75 and 76. The clamping face of the jaw member 76 is formed of a block 76' which is preferably toothed or serrated to increase its gripping power; the block 76' being pivoted centrally to the jaw member 76 in such a manner as to tighten on the pipe E as the strain increases to prevent slipping of the jaw.

When the clamping members 75 and 76 are in position on the pipe E, the threaded end of the latter is disposed in position to enter the threaded coupling F on the pipe D. The pinion 10', on the shaft 11, is then thrown into mesh with the pinion 9' on the shaft 8; the pinions 9 and 9'. so as to be out of engagement with the latter.

When the pinions 9' and 10' are intermeshed, the clutch 15, previously thrown out of engagement with the fly-wheel 16, is again operated so as to transmit motion from the engine shaft through the clutch 15, shaft 14, pinions 13 or 13', toothed wheel 12, shaft 11, pinions, 10' and 9', shaft 8, and pinion 7 to rotate the toothed wheel 6 in such a direction as to screw the threads on the pipe E into the coupling F in the pipe D. After the threads have been properly started, the pinion 10 may be thrown into engagement with the pinion 9, if desired, to increase the speed of rotation of the toothed wheel 6. The toothed wheel 6 in revolving causes the clamping members 75 and 76 to rotate therewith through the plungers 83 and the frames 84, the springs 86 bearing the strains transmitted from the toothed wheel 6 to the clamping members and pipe E. As the pipe E screws into the coupling F, the resistance to turning the pipe E is increased, thereby causing a correspondingly increased strain on the springs 86 through the medium of the plungers 83. The resilient connections between the rotatable member and the pipe E, obviously permit the use of change speed gearing for driving the former.

By determining what force or power is required to set the threaded end of the pipe E into the coupling F, it is possible to determine, through the indicator 90 and the graduations 91, when the pipe E has been screwed sufficiently far into the coupling F to make a tight joint. The movement of the plunger 83 on the compression of the spring 86 causes the rack 87 to rotate the pinion 88 and pointer 90 to indicate on the graduations 91 the extent of the strain imposed on and resisted by the spring 86. When the pipe E has been sufficiently screwed into the coupling F, the toothed wheel 6 is thrown out of operation by manipulating the clutch-operation lever 15' or shifting the pinions 10 and 10', or the pinions 13 and 13', into their inoperative positions to stop the rotation of the wheel 6. Where it is desired to bury the threads of the pipe E in the coupling F, it is only necessary to watch the advance of the pipe E into the coupling F until the threads disappear. The provision of the springs 86, between the plungers 83 and the frame 84, perform an important function, in that pipe E and the clamping members thereon may move inwardly and outwardly, with relation to the toothed wheel 6, as the pipe E is advanced or retracted in the coupling F.

When the pipe E has been set in position, the clamping members 75 and 76 are released therefrom and the clamping member 59 is disengaged from the pipe D by loosening the screw shaft 71 and the arm 68 which allows the links 63 and 66 to drop downwardly with the arm 59 to clear the pipe D. Timbers or blocks, not shown, are then placed beneath the pipes at suitable distances from the carriage 2 so as to support the pipes. The standards 38 are then raised to clear the ground and the entire machine is moved along the pipe line. When the apparatus has been moved to the forward end of the pipe E, the standards 38 are moved downward to position the growler board 40 on the ground, as before described, whereupon another loose section of pipe E is picked up and the level of the carriage 2 adjusted in readiness for another pipe screwing operation, as before described.

While we have shown and described but a single form of our invention herewith, it is understood, nevertheless, that it is susceptible of modification, and therefore many changes in the construction and arrangement of the several parts may be resorted to without departing from the spirit of the invention, as disclosed in the appended claims.

This application is a division of our former application, patented June 22, 1915, under Number 1,143,844.

Having thus described our invention, what we claim and desire to secure by Letters Patent is:—

1. In a pipe screwing machine, a frame to receive a pipe; means for locking the pipe thereto against turning movement, a shaft journaled on the frame, change speed mechanism for rotating said shaft, a rotatable member fixed on the end of the shaft, gripping means spaced outwardly of the shaft, and yielding connections supporting the gripping means from the rotatable member.

2. In a pipe screwing machine, a frame to receive a pipe; means for locking the pipe thereto against turning movement, a rotatable member on the frame, change speed mechanism for rotating said member, gripping means, yielding connections between the rotatable member and gripping means, and strain indicating devices for said connections.

3. In a pipe screwing machine, a rotating member, pipe gripping means, a driving connection between the member and pipe gripping means including flexible means permitting movement of the pipe gripping means toward and from the rotating member and initial rotation of the latter relative to the former.

4. In a pipe screwing machine, a frame, a wheel rotatable thereon having spoke portions, pipe gripping means spaced laterally from the wheel and having outwardly extending parts, and yieldable connections between the spoke portions of the wheel and the outwardly extending parts of the gripping means.

5. In a pipe screwing machine, a frame, a wheel rotatable thereon, pipe gripping means adapted to grip a pipe and spaced laterally from the wheel, said gripping means comprising an arched arm adapted to straddle a pipe and a jaw adjustably secured to the arm, and yieldable connections between the arm and wheel.

6. In a pipe screwing machine, a frame, a wheel rotatable thereon, pipe gripping means adapted to grip a pipe and spaced laterally from the wheel, said gripping means comprising an arched arm having outwardly extended terminals and a jaw secured to the arm, and yieldable connections between the terminals of the arched arm and the wheel and extending laterally from the latter.

7. In a pipe screwing machine, a frame, pipe gripping means, a rotary driving member on the frame, said means and member being adapted to receive a pipe, and an expansible driving connection between the pipe gripping means and the rotary member permitting of relative lateral movement between the means and member.

8. In a pipe screwing machine, a frame, a rotary driving member thereon, a pipe gripping member adapted for lateral movement relative to the driving member to advance with the pipe during a screwing operation, and a driving connection having swivel mounting on the rotary member and detachable engagement with the pipe gripping member.

9. In a pipe screwing member, a rotating member, pipe gripping means spaced therefrom and adapted for movement toward and from the member, and driving connections between the rotating member and the pipe gripping means comprising elongated members contractible and expansible longitudinally.

10. A pipe screwing machine, spaced pipe gripping means, each of which is adapted to grip a respective pipe of those to be connected and one of the means including a rotary part, and a flexible driving connection between the rotary part of the specified means and the other means for driving the latter and permit of relative advancing movement of one means toward the other means.

11. In a pipe screwing machine, a rotary member, pipe gripping means, strain equalizing means connecting the rotary member and the pipe gripping means, and means for indicating the strains imposed on the equalizer.

12. In a pipe screwing machine, a rotary member, pipe gripping means and strain equalizing means connecting the rotary member and the pipe gripping means, said equalizing means comprising a plunger, a guide frame supporting the plunger, and a spring interposed between the plunger head and the frame.

13. In a pipe screwing machine, a rotary member, pipe gripping means and strain equalizing means, said equalizing means comprising a plunger, a guide frame supporting the plunger, a spring interposed between the plunger and the frame, and means for indicating the strains imposed upon the equalizer consisting of a toothed rack carried by the plunger, a pinion engaged by said rack, having an indicator mounted on the track operable by said pinion to indicate on a scale the strains imposed on the spring.

14. In a pipe screwing machine, an arched arm, a gripping jaw carried by the arm, means for adjusting the jaw in relation to the arm to grip a pipe, and a rotary member and strain equalizing means connecting said rotary member to the arched arm.

15. In a pipe screwing machine, an arched arm, a gripping jaw carried thereby, means for operating the gripping jaw to engage a pipe, a rotary member and a spring-pressed plunger interposed between said rotary member and the outer ends of the arched arm to form strain equalizing connections between the arched arm and the rotary member.

16. In a pipe screwing machine, and arched arm, a gripping jaw carried thereby, means for operating the gripping jaw to engage a pipe, a rotary member, a spring-pressed plunger interposed between said rotary member and the outer ends of the arched arm to form strain equalizing means, and means operable by the plunger for indicating strains imposed thereon.

17. In a pipe screwing machine, a carriage to receive a pipe, means for clamping the pipe on said carriage comprising a curved lever mounted on the carriage engageable with the underside of the pipe, toggle links having one link connected to the outer end of the curved arm, and the other link connected to the carriage, and means for operating said toggle and locking it against movement.

18. In a pipe screwing machine, a carriage to receive a pipe, means for clamping the pipe on said carriage comprising a curved lever mounted on the carriage engageable with the underside of the pipe, toggle links having one link connected to the outer end of the curved arm and the other link connected to the carriage, an arm mounted on the carriage, and a threaded shaft carried by said arm engageable with the toggle to operate the latter.

19. In a pipe screwing machine, a driving member, pipe gripping means spaced therefrom, and combined yieldable and strain indicating means spanning the space between and connecting the driving member and pipe gripping means.

20. In a pipe screwing machine, a rotatable driving member, pipe gripping means spaced therefrom, and a radial series of independent means consisting of combined yieldable and strain indicating means spanning the space between and connecting the driving member and pipe gripping means.

In testimony whereof we have hereunto set our hands in the presence of two subscribing witnesses.

JOHN J. MAHONEY.
WILLIAM L. NORRIS.

Witnesses:
JOHN H. HERRING,
W. W. HEALEY.